US011948000B2

(12) United States Patent
Singer et al.

(10) Patent No.: US 11,948,000 B2
(45) Date of Patent: Apr. 2, 2024

(54) GANG SCHEDULING FOR LOW-LATENCY TASK SYNCHRONIZATION

(71) Applicant: Advanced Micro Devices, Inc., Santa Clara, CA (US)

(72) Inventors: Mitchell Howard Singer, Orlando, FL (US); Derrick Trevor Owens, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 442 days.

(21) Appl. No.: 17/219,365

(22) Filed: Mar. 31, 2021

(65) Prior Publication Data

US 2022/0129308 A1 Apr. 28, 2022

Related U.S. Application Data

(60) Provisional application No. 63/106,249, filed on Oct. 27, 2020.

(51) Int. Cl.
*G06F 9/48* (2006.01)
*G06F 9/54* (2006.01)
*G06T 1/20* (2006.01)

(52) U.S. Cl.
CPC ............ *G06F 9/4881* (2013.01); *G06F 9/544* (2013.01); *G06T 1/20* (2013.01)

(58) Field of Classification Search
CPC .................................................... G06F 9/4881
See application file for complete search history.

(56) References Cited

U.S. PATENT DOCUMENTS 6,519,683 B2  2/2003 Samra et al.
6,782,445 B1  8/2004 Olgiati et al.
(Continued)

FOREIGN PATENT DOCUMENTS

EP      2466476 A1   6/2012
WO     99/00936 A1   1/1999
WO   2019231904 A1  12/2019

OTHER PUBLICATIONS

International Search Report and Written Opinion in International Application No. PCT/US2019/034161, dated Sep. 18, 2019, 14 pages.

(Continued)

*Primary Examiner* — Charlie Sun
(74) *Attorney, Agent, or Firm* — Kowert, Hood, Munyon, Rankin & Goetzel, P.C.; Rory D. Rankin

(57) ABSTRACT

Systems, apparatuses, and methods for performing command buffer gang submission are disclosed. A system includes at least first and second processors and a memory. The first processor (e.g., CPU) generates a command buffer and stores the command buffer in the memory. A mechanism is implemented where a granularity of work provided to the second processor (e.g., GPU) is increased which, in turn, increases the opportunities for parallel work. In gang submission mode, the user-mode driver (UMD) specifies a set of multiple queues and command buffers to execute on those multiple queues, and that work is guaranteed to execute as a single unit from the GPU operating system scheduler point of view. Using gang submission, synchronization between command buffers executing on multiple queues in the same submit is safe. This opens up optimization opportunities for application use (explicit gang submission) and for internal driver use (implicit gang submission).

20 Claims, 7 Drawing Sheets

(56) References Cited

U.S. PATENT DOCUMENTS

| | | |
|---|---|---|
| 6,782,461 B2 | 8/2004 | Lam |
| 7,047,322 B1 | 5/2006 | Bauman et al. |
| 7,406,554 B1 | 7/2008 | Huffman |
| 7,689,793 B1 | 3/2010 | Solt et al. |
| 7,768,910 B2 | 8/2010 | Neidhardt et al. |
| 9,397,961 B1 | 7/2016 | Bailey |
| 9,424,045 B2 | 8/2016 | Airaud et al. |
| 9,606,800 B1 | 3/2017 | Hameenanttila et al. |
| 10,552,163 B2 | 2/2020 | Chan |
| 10,601,723 B2 | 3/2020 | Smith et al. |
| 11,334,384 B2 | 5/2022 | Garg et al. |
| 2002/0019927 A1 | 2/2002 | Hondou |
| 2004/0151197 A1 | 8/2004 | Hui |
| 2005/0283772 A1 | 12/2005 | Muthukumar et al. |
| 2006/0080478 A1 | 4/2006 | Seigneret et al. |
| 2006/0174247 A1 | 8/2006 | Farrell et al. |
| 2007/0220388 A1 | 9/2007 | Quereshi et al. |
| 2007/0223372 A1 | 9/2007 | Haalen et al. |
| 2008/0320274 A1 | 12/2008 | Singh et al. |
| 2009/0019264 A1 | 1/2009 | Correale, Jr. et al. |
| 2009/0019265 A1 | 1/2009 | Correale, Jr. et al. |
| 2010/0241760 A1 | 9/2010 | Zhang et al. |
| 2010/0318716 A1 | 12/2010 | Nguyen |
| 2010/0325394 A1 | 12/2010 | Golla et al. |
| 2011/0044699 A1 | 2/2011 | Li et al. |
| 2011/0078697 A1 | 3/2011 | Smittle et al. |
| 2011/0145616 A1 | 6/2011 | Rychlik et al. |
| 2011/0280307 A1* | 11/2011 | MacInnis ........... H04N 5/44504 375/240.15 |
| 2012/0144175 A1 | 6/2012 | Venkataramanan et al. |
| 2014/0379506 A1 | 12/2014 | Marshall et al. |
| 2014/0380324 A1 | 12/2014 | Xiao et al. |
| 2015/0081941 A1 | 3/2015 | Brown et al. |
| 2015/0095666 A1 | 4/2015 | Ananthakrishnan et al. |
| 2015/0106595 A1 | 4/2015 | Khot et al. |
| 2017/0017490 A1 | 1/2017 | Caulfield |
| 2017/0177261 A1 | 6/2017 | Filderman et al. |
| 2017/0230269 A1 | 8/2017 | Kamath et al. |
| 2019/0163486 A1 | 5/2019 | Sinharoy et al. |
| 2019/0220949 A1 | 7/2019 | Dutta et al. |
| 2019/0347125 A1 | 11/2019 | Sankaran et al. |
| 2019/0369991 A1 | 12/2019 | Sobel et al. |

OTHER PUBLICATIONS

"Efficient Scheduling and Operand Renaming of Groups of Instructions", Research Disclosure, Apr. 1, 1999, pp. 580-584, No. 420138, Kenneth Mason Publications, UK, GB.

Shah et al., "Optimal Queue-Size Scaling in Switched Networks", The Annals of Applied Probability, Sep. 3, 2014, 40 pages, vol. 24, No. 6, Institute of Mathematical Statistics, https://arxiv.org/pdf/1110.4697.pdf. [Retrieved Apr. 2, 2018].

International Search Report and Written Opinion in International Application No. PCT/US2019/026571, dated Jun. 21, 2019, 12 pages.

International Search Report and Written Opinion in International Application No. PCT/US2020/063765, dated Mar. 22, 2021, 11 pages.

Notice of Allowance in U.S. Appl. No. 15/991,088, dated Nov. 24, 2021, 9 pages.

* cited by examiner

GANG SCHEDULING FOR LOW-LATENCY TASK SYNCHRONIZATION

CROSS REFERENCE TO RELATED APPLICATIONS

This application claims priority to Provisional Patent Application Ser. No. 63/106,249, entitled "Gang Scheduling for Low-Latency Task Synchronization", filed Oct. 27, 2020, the entirety of which is incorporated herein by reference.

BACKGROUND

Description of the Related Art

Graphics processor units (GPUs) are rapidly increasing in processing power. The increase in processing power is, at least in part, due to multiple independent processing units (e.g., single instruction multiple data (SIMD) processors, arithmetic logic units (ALUs)) that are included in a GPU. In many graphics applications, the multiple independent processing units are utilized to perform parallel geometry computations, vertex calculations, and/or pixel operations. For example, graphics applications can include the same sequence of instructions being executed on multiple parallel data streams to yield substantial speedup of operations. Another growing trend is the use of GPU for general purpose computations that may not necessarily be SIMD-type computations. In this style of computing, the CPU can use the GPU for performing compute work items that were usually done in the CPU.

Conventionally, the CPU sends work to be performed to the GPU. Software executing on the CPU may enqueue the various items of work, also referred to as "commands", in a command buffer, with the command buffer being placed in a work queue. In a typical programming model, dependent work running on multiple queues is synchronized using the CPU (e.g., using fence/barrier objects to confirm completion of one queue's work before submitting work to the next queue). This requires a round-trip communication back and forth between the GPU and CPU. Due to the nature in which work is submitted, this mechanism introduces significant latency to the completion of the work.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

Figure 1:
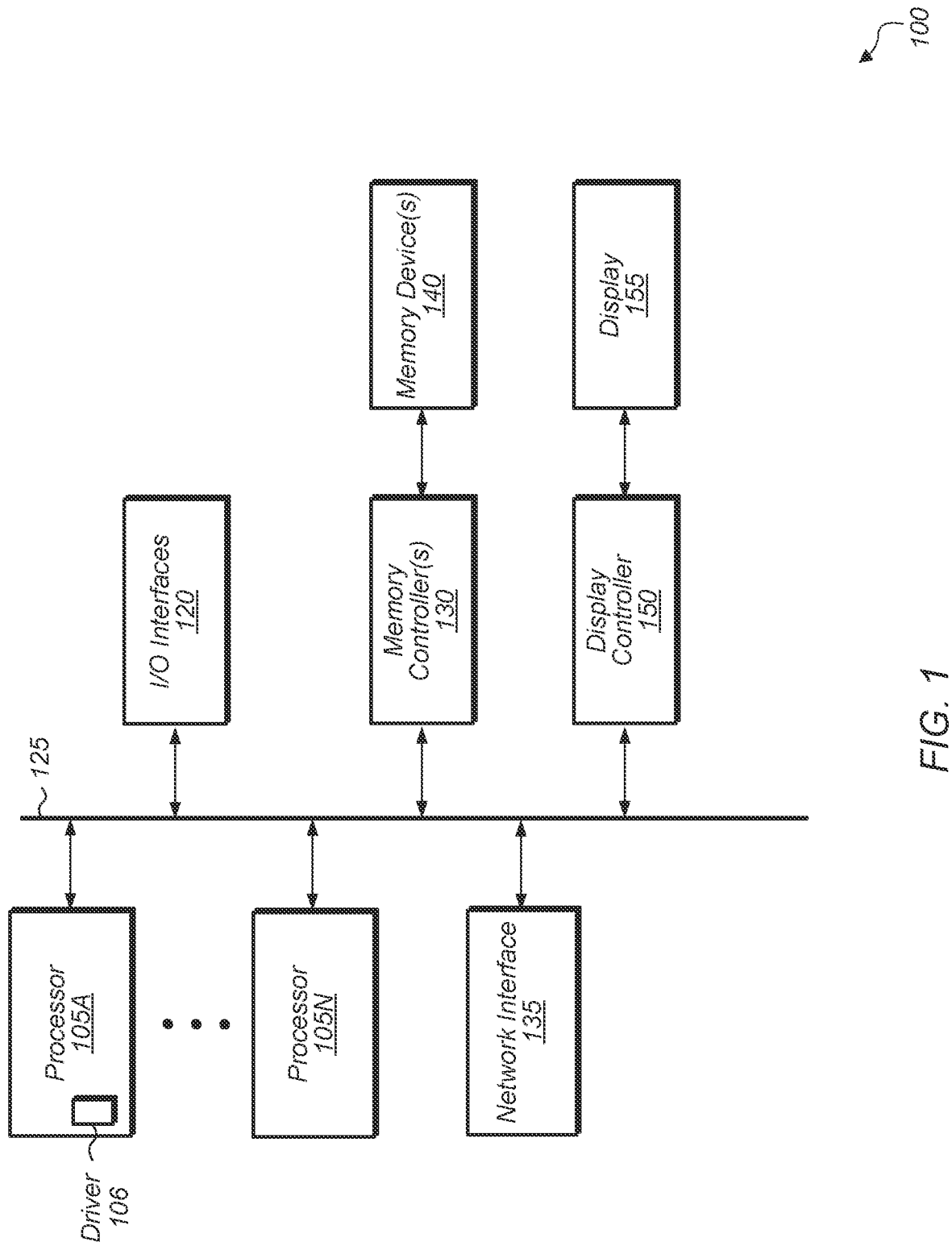
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for performing command buffer gang submission are disclosed herein. In one implementation, a system includes at least a first processor, a second processor, and a memory accessible by the first and second processors. The system includes a mechanism where a granularity of work provided to the second processor (e.g., GPU) is increased which, in turn, increases the opportunities for parallel work. In one implementation, the first processor executes a user-mode driver (UMD) which is able to operate in gang submission mode. In gang submission mode, the UMD specifies a set of multiple queues and command buffers to execute on those multiple queues, and the work (contained in the command buffers) is guaranteed to execute as a single unit from the GPU operating system scheduler point of view. Using gang submission, synchronization between command buffers executing on multiple queues in the same submit is safe. This opens up optimization opportunities for application use (explicit gang submission) and for internal driver use (implicit gang submission).

In general, the techniques described herein are advantageous when it is desired to keep two or more pieces of hardware closely synchronized. The prior art relies on slow synchronization objects. A slow synchronization object for the GPU will go all the way back to the CPU, and then turn back around to the GPU to launch more work. Slow synchronization objects are also referred to as coarse-grained synchronization objects. Gang scheduling enables the submission of one item that internal to the one item has two or more queues that all can run in parallel. In one implementation, the queues represent threads of a processor that can run in parallel. And the queues can communicate using fine-grained, low-latency synchronization objects which do not go back to the CPU. From the point of view of the GPU, the queues come as a group and exit as a group. The queues can communicate often inside of the graphics engine. This is referred to as low-latency communication between queues that are executing simultaneously. The queues are retired (i.e., exit) the processor at the same time. The low-latency synchronization objects are also referred to as fine-grained synchronization objects.

The techniques described herein enable a producer and consumer to work in smaller batches, hand off the data to each other in smaller batches, and use less memory. For example, if a producer is processing 50,000 primitives, rather than waiting until all 50,000 primitives have been processed, a synchronization object can be passed to the consumer when 500 primitives are ready. This allows the consumer to start sooner than otherwise. Another advantage of this technique is that memory for holding all of the data is not required. Rather, the only memory needed is memory for holding a chunk of data that is being processed and passed between queues. All of the data will go through one or more relatively small buffers, little by little, as the producer and consumer process the chunks of data. It should be understood that these examples of 50,000 total primitives and 500 primitives in a batch are merely illustrative of one implementation. This concept can be applied to any number of objects being processed and/or any batch size.

In one implementation, one of the queues receives a list of primitives and the queue culls (i.e., removes) primitives that will not be visible on the screen. Then the queue passes the successful (non-culled) list to the graphics engine for rendering. In another implementation, work is generated procedurally using a function and input data. Procedural generation refers to a method of creating data algorithmically rather than manually. As data is generated procedurally, the data is handed off to another queue to render the data without going back to the CPU. In this way, the work and communication is contained entirely within the graphics unit.

In one implementation, an application programming interface (API) is exposed for a programmer to explicitly create a gang in an application. The gang could define certain types of queues that are included within the gang. Synchronization objects, functions, sets, and weights on those objects would be provided. All of these queues, objects, and functions could be launched as a gang and retired as a gang. The application generates the work according to the API.

In another implementation, an application is performing work using a plurality of queues, and the work is intercepted (by a driver, in one implementation) and a gang is created out of queues that are normally submitted separately. Also, the driver converts slow synchronization objects into fast synchronization objects. This allows the performance to be optimized without the application being aware of the gang submissions. When different queues are grouped into a gang, the ordering which was originally implied by the programmer remains the same, while lowering the synchronization cost.

In one implementation, the driver tracks queues, synchronization objects, and other API items to handle correctness while still buffering the data to apply the gang submission optimization. In one implementation, the driver generates a scene graph of the application's work being submitted, and the driver determines if optimizations can be applied to build a better work submission model using gang submission techniques. The scene graph encodes objects as nodes connected via pairwise relationships as edges. The application is unaware of the gang submission technique, but the driver converts the application's submissions into gang submissions.

In one implementation, a task shader is generated by an application, and the driver divides the task shader across several queues using gang submission to synchronize between the queues. This occurs while the OS assumes that the request includes only a single queue.

In one implementation, the application generates multiple requests for multiple queues to be submitted to a graphics engine. In one implementation, the driver combines the multiple queues together into a single request. The driver also converts slow synchronization objects into fast synchronization objects. The driver then submits the single request to the graphics engine. The single request includes a payload of N queues, where "N" is a positive integer greater than one. When the single request is processed by the graphics engine, the N queues are launched with fast synchronization objects to ensure ordering and correctness, but the N queues are retired together to complete the single request.

Explicit gang submission refers to a mode where the application explicitly creates a gang of queues and submits command buffers that perform explicit synchronization across queues. Implicit gang submission refers to a mode where the application is unaware of gang submission but the driver (either the API layer or platform abstract layer (PAL)) splits parallelizable work onto separate queues along with all necessary synchronization. While the application believes it is submitting a single command buffer to a single queue, the driver may in fact submit a gang (multiple) of command buffers to a gang of queues.

In one implementation, the driver PAL implements the direct memory access (DMA) queue as a gang consisting of a system DMA (SDMA) engine queue and an asynchronous compute engine (ACE) queue. With this approach, the virtualized DMA queue could support any blit operation, where PAL would put most work on the SDMA engine queue and work that is not supported there would be put on the ACE queue. PAL would add synchronization between the two engines to ensure blits occur in order where required.

In one embodiment, the API layer implements a universal queue as a gang consisting of a universal engine queue and an asynchronous compute engine queue. With proper dependency tracking, optimizations are performed such as automatically moving some compute workloads to an ACE or executing blits on an ACE/SDMA in parallel with graphics work at the beginning of a submission.

In a typical programming model, dependent work running on multiple queues is synchronized either with the CPU (e.g., using IFence objects to confirm completion of one queue's work before submitting work to the next queue) or with the GPU operating system (OS) scheduler using IQueueSemaphore objects. These mechanisms introduce significant latency (on the order of 200 microseconds (µs) for queue semaphores) and do not allow fine-grain scheduling of work inside a command buffer. Both of those issues are solved by allowing cross-queue synchronization with PAL's existing IGpuEvent objects. As used herein, a "IQueueSemaphore" is defined as a queue semaphore that can be signaled and waited on in order to control execution order between queues. Also, as used herein, a "IGpuEvent" is defined as a synchronization object passed between a CPU and GPU.

In one implementation, a kernel-mode driver (KMD) operates in gang submission mode. In this mode, the user-mode driver (UMD) specifies a set of multiple queues and command buffers to execute on those queues, and that work will be guaranteed to execute as a single unit from the OS GPU scheduler point of view. Using gang submission, IGpuEvent synchronization between command buffers executing on multiple queues in the same submit is safe. This opens up optimization opportunities for application use (explicit gang submission) and for internal driver use (implicit gang submission).

The interface allows the UMD to supplement a normal OS-visible submission (i.e., public submission) with additional private submissions to other hardware scheduler queues, specified in private data. In one implementation, the OS is unaware of the private submissions. In this implementation, the KMD will only signal the OS that a public submission is complete when all attached private submissions are also complete. In this implementation, fences and queue semaphores (i.e., monitored fences) continue to work as before, but only for public submissions.

Explicit gang submission refers to a mode where the application explicitly creates a gang of queues and submits command buffers that perform explicit synchronization across queues using IGpuEvent objects. Implicit gang submission refers to a mode where the application is unaware of gang submission but the driver (either the API layer or PAL) splits parallelizable work onto a separate queue along with all necessary synchronization. When the application believes it is submitting a single command buffer to a single queue, the driver may in fact submit a corresponding gang of command buffers to a gang of queues.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105A executes a driver 106 (e.g., graphics driver) for controlling the operation of one or more of the other processors in system 100. It is noted that depending on the implementation, driver 106 can be implemented using any suitable combination of hardware, software, and/or firmware. In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155. In another implementation, processors 105A-N include a CPU and multiple GPUs, with the CPU submitting work to the multiple GPUs using explicit or implicit gang submission.

Memory controller(s) 130 are representative of any number and type of memory controllers accessible by processors 105A-N. While memory controller(s) 130 are shown as being separate from processor 105A-N, it should be understood that this merely represents one possible implementation. In other implementations, a memory controller 130 can be embedded within or on the same semiconductor die as one or more of processors 105A-N. Memory controller(s) 130 are coupled to any number and type of memory devices (s) 140. For example, the type of memory in memory device(s) 140 includes high-bandwidth memory (HBM), non-volatile memory (NVM), Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network (not shown).

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
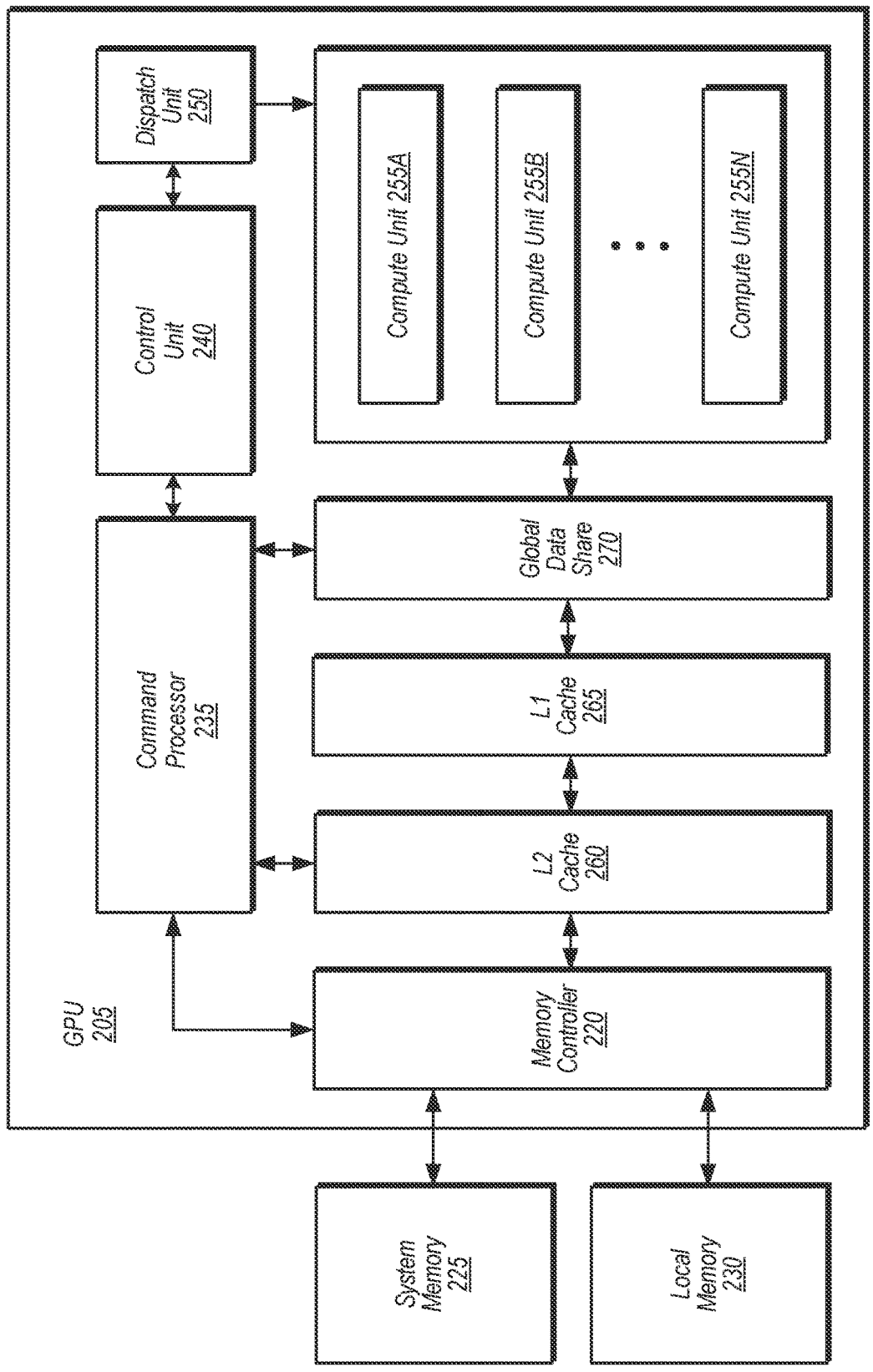
FIG. 2 is a block diagram of another implementation of a computing system.

Turning now to FIG. 2, a block diagram of another implementation of a computing system 200 is shown. In one implementation, system 200 includes GPU 205, system memory 225, and local memory 230. System 200 can also include other components which are not shown to avoid obscuring the figure. GPU 205 includes at least command processor 235, control unit 240, dispatch unit 250, compute units 255A-N, memory controller 220, global data share 270, level one (L1) cache 265, and level two (L2) cache 260. In other implementations, GPU 205 includes other components, omits one or more of the illustrated components, has multiple instances of a component even if only one instance is shown in FIG. 2, and/or is organized in other suitable manners. In one implementation, the circuitry of GPU 205 is included in processor 105N (of FIG. 1).

In various implementations, computing system 200 executes any of various types of software applications. As part of executing a given software application, a host CPU (not shown) of computing system 200 launches work to be performed on GPU 205. In one embodiment, command processor 235 receives indirect buffer packets from the host CPU and locates corresponding command buffers using the addresses in the packets. Command processor 235 uses dispatch unit 250 to issue commands from the command buffers to compute units 255A-N. As used herein, a "command buffer" is defined as a data structure configured to store executable instructions and/or commands along with associated data. Also, as used herein, to "process" a command buffer is defined as executing the commands stored within the command buffer. It is noted that commands executing on compute units 255A-N can cause data to be read from and/or written to global data share 270, L1 cache 265, and L2 cache 260 within GPU 205. Although not shown in FIG. 2, in one implementation, compute units 255A-N also include one or more caches and/or local memories within each compute unit 255A-N.

Figure 3:
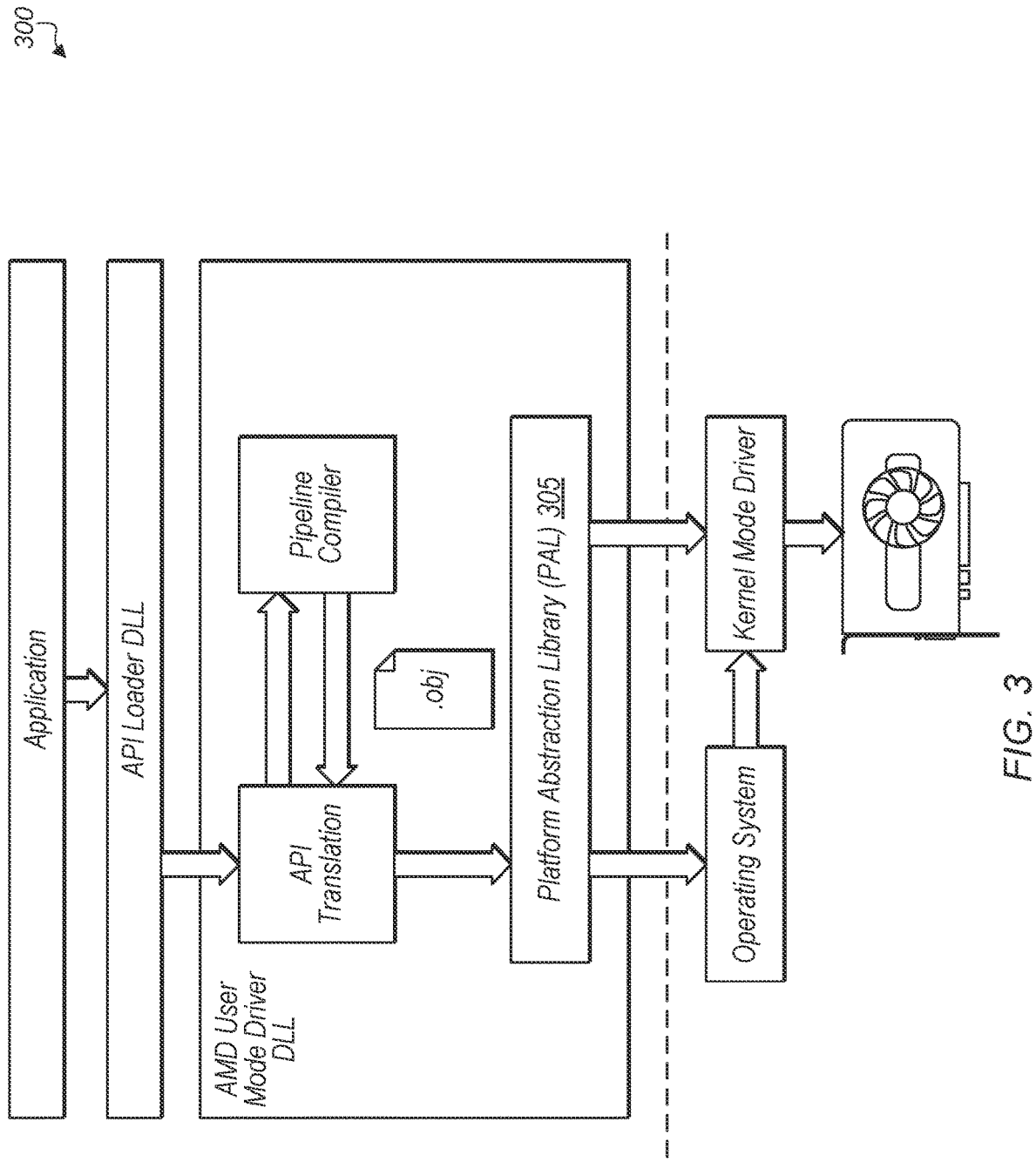
FIG. 3 is a block diagram of one implementation of a software stack when running an application with a Platform Abstraction Layer (PAL)-based UMD.

Referring now to FIG. 3, a diagram 300 which illustrates one example of a software stack when running a 3D application with a PAL-based user mode driver (UMD) is shown. In one implementation, an object-oriented model is defined for interacting with the GPU and OS. In one example, all shader stages, and some additional "shader adjacent" state, are combined together into a monolithic pipeline object. In one implementation, explicit, free-threaded command buffer generation is supported. Also, multiple, asynchronous engines for executing GPU work (graphics, compute, DMA) are supported. PAL 305 translates API commands into PAL commands. This means that an application is typically unaware of hardware mechanisms and features. However, PAL 305 is an abstraction of the hardware, while many things in the PAL interface have an obvious correlation to hardware features.

In one implementation, the kernel mode driver generates a gang submission by combining a plurality of work queues into a single unit. The driver also converts slow (i.e., coarse-grained) synchronization objects into fast (i.e., fine-grained) synchronization objects. The driver then submits the single request to the graphics engine. The single request includes a payload of N queues, where "N" is a positive integer greater than one. When the single request is processed by the graphics engine, the N queues are launched with fast synchronization objects to ensure ordering and correctness, but the N queues are retired together to complete the single request.

Figure 4:
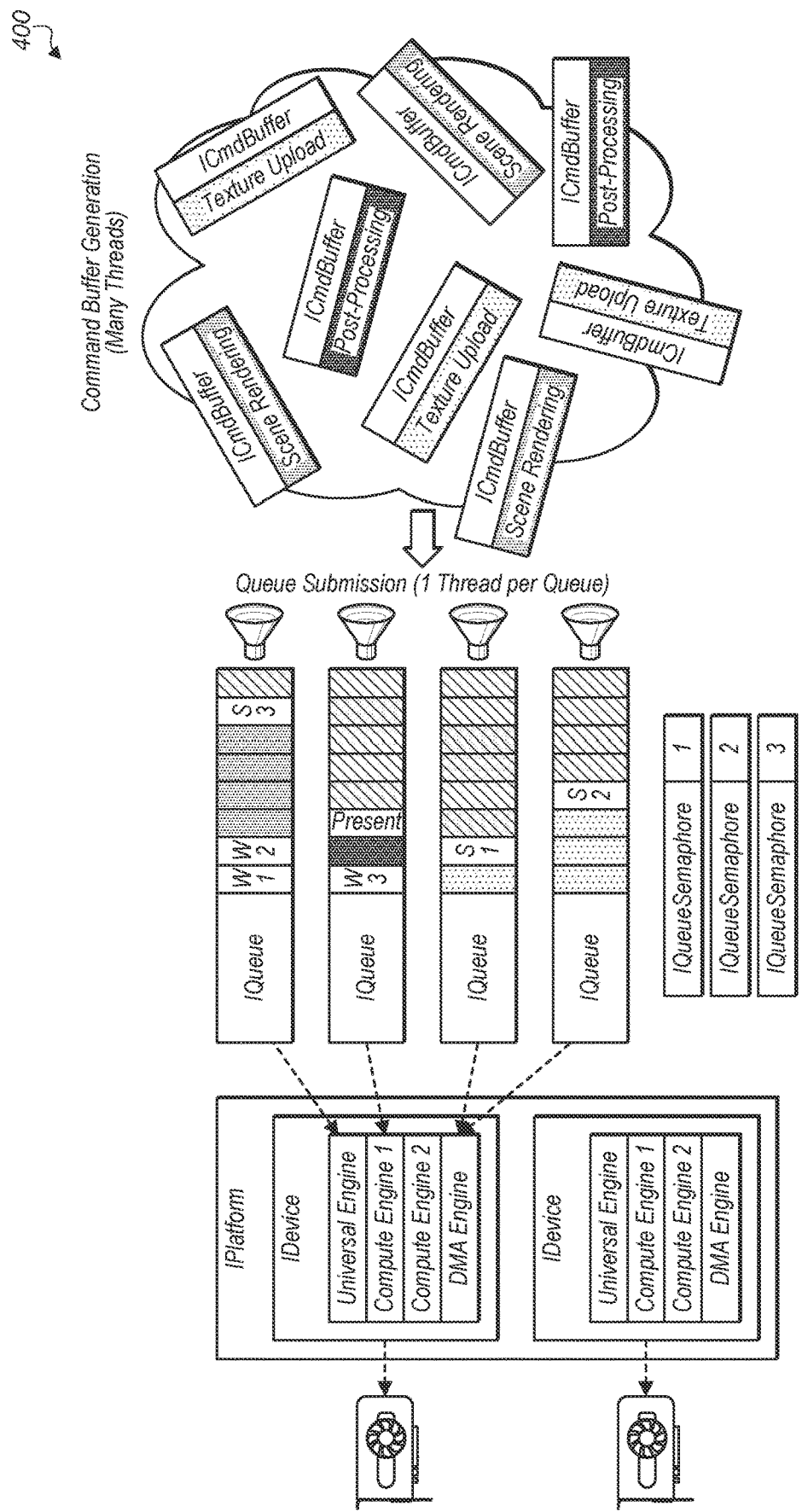
FIG. 4 is a block diagram of one implementation of command buffer submission.

Turning now to FIG. 4, a diagram 400 which illustrates command buffer generation and work queue submission is shown. A command buffer generates many threads during rendering. The command buffers for these threads are enqueued in any number of queues. The queues are then submitted to the processing engines on the target processor (e.g., GPU). An example processor architecture, for example, has 1 universal engine (supports graphics, compute, and copy commands), 2 compute engines (support compute and copy commands), and 2 DMA engines (support only copy commands). An IQueue object is a context for submitting work on a particular engine. This mainly takes the form of submitting command buffers and presenting images to the screen. Work performed in a queue will be started in order, but work executed on different queues (even if the queues reference the same engine) is not guaranteed to be ordered without explicit synchronization. The use of semaphores is one technique for ensuring synchronization. In other implementations, other synchronization objects can be used.

Figure 5:
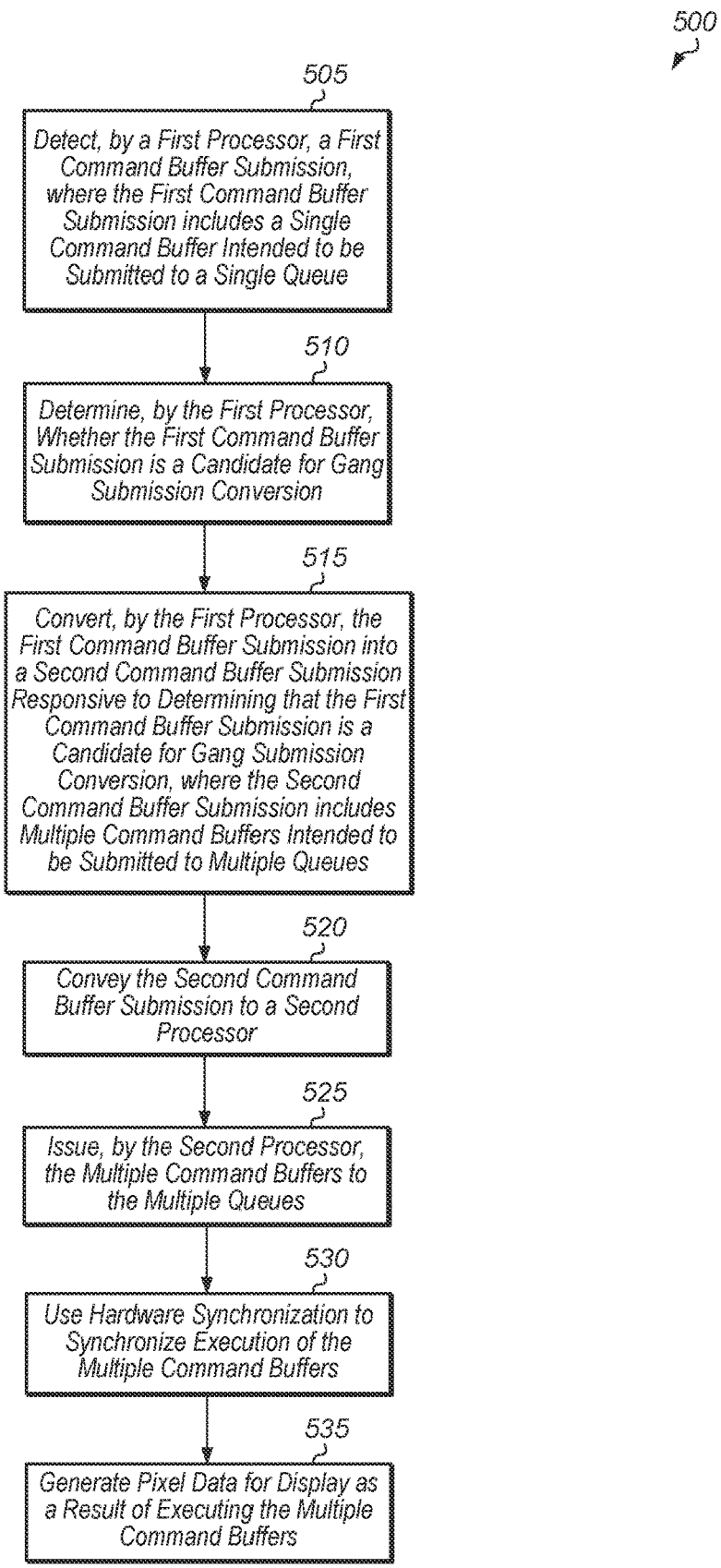
FIG. 5 is a generalized flow diagram illustrating one implementation of a method for performing gang submission.
Figure 6:
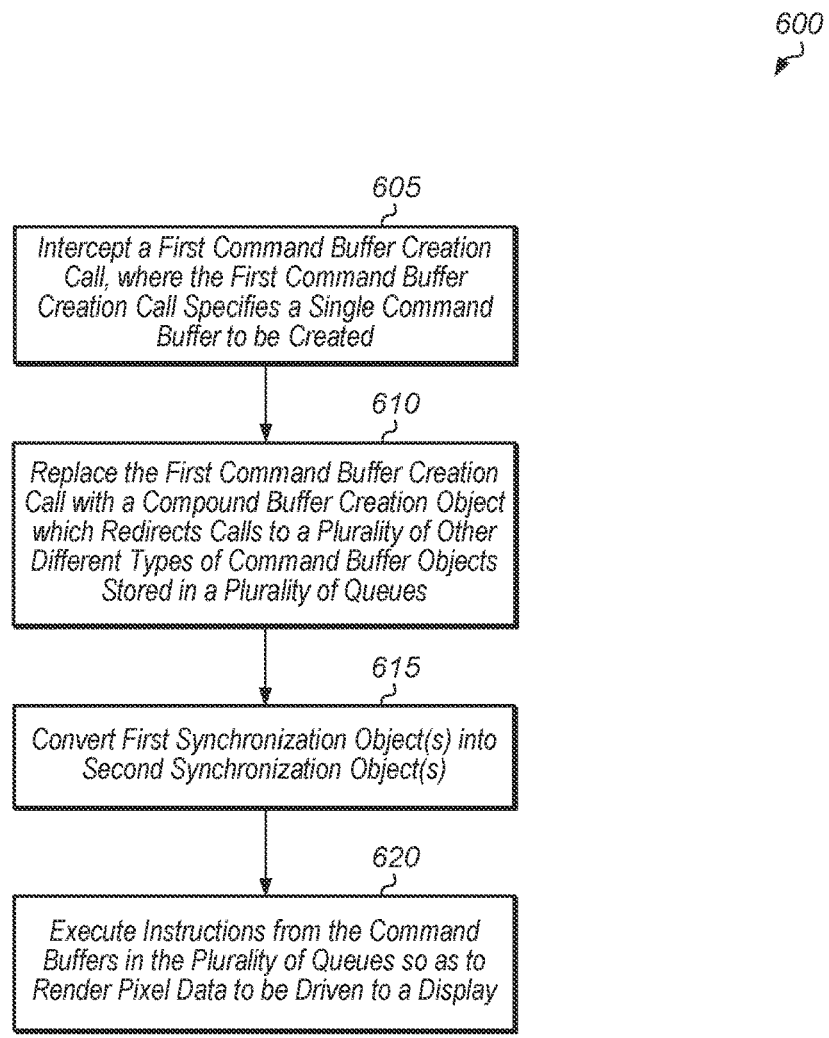
FIG. 6 is a generalized flow diagram illustrating one implementation of a method for replacing command buffer creation calls.
Figure 7:
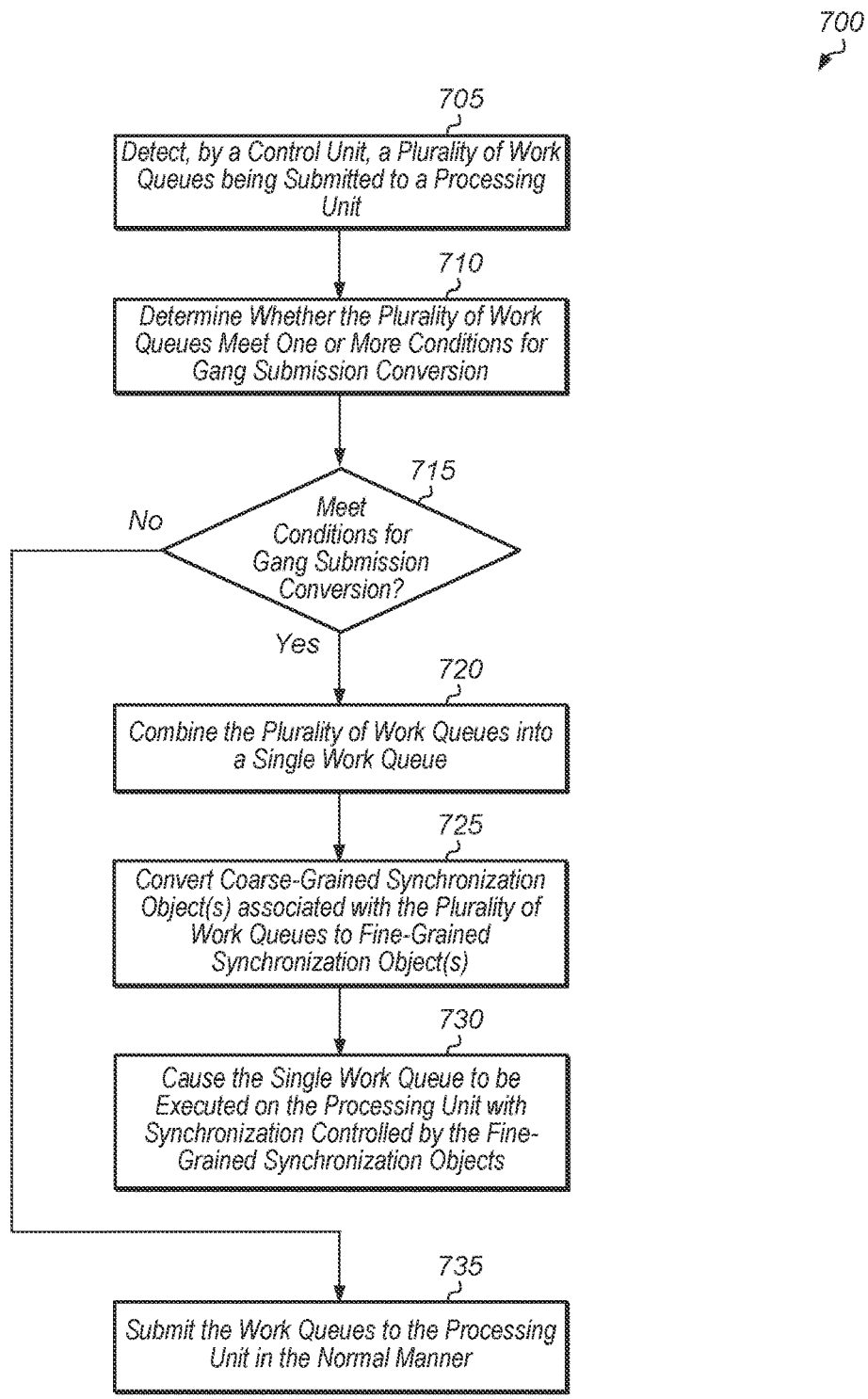
FIG. 7 is a generalized flow diagram illustrating one implementation of a method for combining a plurality of work queues.

Referring now to FIG. 5, one implementation of a method 500 for performing gang submission is shown. For purposes of discussion, the steps in this implementation and those of FIG. 6-7 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

A first processor (e.g., CPU) detects a first command buffer submission, includes a single command buffer intended to be submitted to a single queue (block 505). The first processor determines whether the first command buffer submission is a candidate for gang submission conversion (block 510). Next, the first processor converts the first command buffer submission into a second command buffer submission responsive to determining that the first command buffer submission is a candidate for gang submission conversion, where the second command buffer submission includes multiple command buffers intended to be submitted to multiple queues (block 515). Also, in one implementation, the first processor converts software synchronization objects into hardware synchronization commands. Then, the second command buffer submission is conveyed to a second processor (e.g., GPU) (block 520).

In response to receiving the second command buffer submission, the second processor issues the multiple command buffers to the multiple queues (block 525). The second processor uses hardware synchronization to synchronize execution of the multiple command buffers (block 530). Then, the second processor generates pixel data for display as a result of execution of the multiple command buffers (block 535). After block 535, method 500 ends. It is noted that method 500 can be repeated any number of times for different command buffer submissions from the first processor to the second processor.

Turning now to FIG. 6, one implementation of a method 600 for replacing command buffer creation calls is shown. A first processor, executing a graphics driver, intercepts a first command buffer creation call, wherein the first command buffer creation call specifies a single command buffer to be created (block 605). The graphics driver, executing on the first processor, replaces the first command buffer creation call with a compound buffer creation object which redirects calls to a plurality of other different types of command buffer objects stored in a plurality of queues (block 610). In one implementation, the plurality of different types of command buffer objects include compute, graphics, and copy buffers. Also, the graphics driver converts one or more first synchronization objects into one or more second synchronization objects (block 615). A second processor executes instructions from the command buffers in the plurality of queues so as to render pixel data to be driven to a display (block 620). After block 620, method 600 ends.

Referring now to FIG. 7, one implementation of a method 700 for combining a plurality of work queues is shown. A control unit (e.g., driver) detects a plurality of work queues being submitted to a processing unit (block 705). The control unit can be implemented using any suitable combination of circuitry and/or program instructions. In one implementation, the control unit is a driver while in other implementations, the control unit can be other types of hardware and/or software components.

The control unit determines whether the plurality of work queues meet one or more conditions for gang submission conversion (block 710). In one implementation, the control unit generates a scene graph of the application's work being submitted, and the control unit determines if optimizations can be applied to build a better work submission model using gang submission techniques. The scene graph encodes objects as nodes connected via pairwise relationships as edges. In other implementations, the control unit uses other analysis techniques to determine whether the work queues can be combined.

If the plurality of work queues meet the one or more conditions for gang submission conversion (conditional block 715, "yes" leg), then the control unit combines the plurality of work queues into a single work queue (block 720). Also, the control unit converts one or more coarse-grained synchronization objects associated with the plurality of work queues to one or more fine-grained synchronization objects (block 725). Then, the control unit causes the single work queue to be executed on the processing unit with synchronization controlled by the one or more fine-grained synchronization objects (block 730). After block 730, method 700 ends. If the plurality of work queues do not meet the one or more conditions for gang submission conversion (conditional block 715, "no" leg), then the control unit submits the work queues to the processing unit in the normal manner (block 735). After block 735, method 700 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a first processor comprising circuitry configured to:
determine whether a first command buffer submission is a candidate for gang submission conversion, wherein the first command buffer submission includes a single command buffer intended to be submitted to a single work queue;
responsive to determining that the first command buffer is a candidate for gang submission conversion, convert the first command buffer submission into a second command buffer submission, wherein the second command buffer submission includes multiple command buffers intended to be submitted to multiple work queues; and
a second processor comprising circuitry configured to:
receive the second command buffer submission;
issue the multiple command buffers to the multiple work queues; and
synchronize execution of the multiple command buffers across the multiple work queues.

2. The system as recited in claim 1, wherein the second processor is further configured to generate pixel data for display as a result of execution of the multiple command buffers.

3. The system as recited in claim 1, wherein the single work queue comprises a plurality of different types of command buffer objects.

4. The system as recited in claim 3, wherein the plurality of different types of command buffer objects comprise compute, graphics, and copy command buffers.

5. The system as recited in claim 1, wherein execution is synchronized using one or more fine-grained synchronization objects which are local to the second processor.

6. The system as recited in claim 1, wherein the first command buffer submission specifies only one command buffer to be created.

7. The system as recited in claim 1, wherein the multiple command buffers execute as a single unit from a point of view of an operating system of the first processor.

8. A method comprising:
determining, by a first processor comprising circuitry, whether a first command buffer submission is a candidate for gang submission conversion, wherein the first command buffer submission includes a single command buffer intended to be submitted to a single work queue;
responsive to determining that the first command buffer is a candidate for gang submission conversion, converting the first command buffer submission into a second command buffer submission, wherein the second command buffer submission includes multiple command buffers intended to be submitted to multiple work queues;
receiving, by a second processor comprising circuitry, the second command buffer submission;
issuing the multiple command buffers to the multiple work queues; and
synchronizing execution of the multiple command buffers across the multiple work queues.

9. The method as recited in claim 8, further comprising generating, by the second processor, pixel data for display as a result of execution of the multiple command buffers.

10. The method as recited in claim 8, wherein the single work queue comprises a plurality of different types of command buffer objects.

11. The method as recited in claim 10, wherein the plurality of different types of command buffer objects comprise compute, graphics, and copy command buffers.

12. The method as recited in claim 8, wherein execution is synchronized using one or more fine-grained synchronization objects which are local to the second processor.

13. The method as recited in claim 8, wherein the first command buffer submission specifies only one command buffer to be created.

14. The method as recited in claim 8, wherein the multiple command buffers execute as a single unit from a point of view of an operating system of the first processing unit.

15. An apparatus comprising:
a memory storing a plurality of work queues; and
a control unit comprising circuitry configured to:
determine whether a first command buffer submission is a candidate for gang submission conversion, wherein the first command buffer submission includes a single command buffer intended to be submitted to a single work queue;
responsive to determining that the first command buffer is a candidate for gang submission conversion:
convert the first command buffer submission into a second command buffer submission, wherein the second command buffer submission includes multiple command buffers intended to be submitted to multiple work queues; and
cause execution of the multiple command buffers across the multiple work queues to be synchronized on a processor controlled by one or more fine-grained synchronization objects.

16. The apparatus as recited in claim 15, wherein the control unit is configured to cause the processor to execute instructions from the multiple command buffers so as to render pixel data to be driven to a display.

17. The apparatus as recited in claim 15, wherein the single work queue comprises a plurality of different types of command buffer objects.

18. The apparatus as recited in claim 17, wherein the plurality of different types of command buffer objects comprise compute, graphics, and copy command buffers.

19. The apparatus as recited in claim 15, wherein the one or more fine-grained synchronization objects are local to the processor.

20. The apparatus as recited in claim 15, wherein the first command buffer submission specifies only one command buffer to be created.

\* \* \* \* \*